(12) United States Patent
Bose et al.

(10) Patent No.: US 10,339,015 B2
(45) Date of Patent: *Jul. 2, 2019

(54) MAINTAINING SYSTEM RELIABILITY IN A CPU WITH CO-PROCESSORS

(71) Applicant: INTERNATIONAL BUSINESS MACHINES CORPORATION, Armonk, NY (US)

(72) Inventors: Pradip Bose, Yorktown Heights, NY (US); Alper Buyuktosunoglu, White Plains, NY (US); Jingwen Leng, Yorktown Heights, NY (US); Ramon Bertran Monfort, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,251

(22) Filed: Dec. 5, 2017

(65) Prior Publication Data

US 2018/0267868 A1 Sep. 20, 2018

Related U.S. Application Data

(63) Continuation of application No. 15/459,788, filed on Mar. 15, 2017.

(51) Int. Cl.
*G06F 11/00* (2006.01)
*G06F 11/16* (2006.01)

(52) U.S. Cl.
CPC ...... *G06F 11/1658* (2013.01); *G06F 11/1629* (2013.01); *G06F 2201/805* (2013.01); *G06F 2201/82* (2013.01)

(58) Field of Classification Search
CPC .................................................. G06F 11/1658
(Continued)

(56) References Cited

U.S. PATENT DOCUMENTS 6,615,366 B1 9/2003 Grochowski et al.
7,472,051 B2 12/2008 Mariani et al.
(Continued)

OTHER PUBLICATIONS

Abdel-Majeed, et al., "Warped-RE: Low-Cost Error Detection and Correction in GPUs", 2015 45th Annual IEEE/IFIP International Conference on Dependable Systems and Networks, Jun. 2015, pp. 331-342.

(Continued)

*Primary Examiner* — Dieu Minh T Le
(74) *Attorney, Agent, or Firm* — Tutujian & Bitetto, P.C.; Jennifer R. Davis

(57) ABSTRACT

A computer-implemented method is provided that is performed in a computer having a processor and multiple co-processors. The method includes launching a same set of operations in each of an original co-processor and a redundant co-processor, from among the multiple co-processors, to obtain respective execution signatures from the original co-processor and the redundant co-processor. The method further includes detecting an error in an execution of the set of operations by the original co-processor, by comparing the respective execution signatures. The method also includes designating the execution of the set of operations by the original co-processor as error-free and committing a result of the execution, responsive to identifying a match between the respective execution signatures. The method additionally includes performing an error recovery operation that replays the set of operations by the original co-processor and the redundant co-processor, responsive to identifying a mismatch between the respective execution signatures.

7 Claims, 7 Drawing Sheets

(58) Field of Classification Search
USPC .......... 714/12, 1, 10, 11, 13, 6.3, 20, 23, 24
See application file for complete search history.

(56) References Cited

U.S. PATENT DOCUMENTS

| | | | |
|---|---|---|---|
| 8,788,871 B2 | 7/2014 | Krishnamurthy et al. | |
| 8,826,069 B2 | 9/2014 | Krishnamurthy et al. | |
| 2005/0050387 A1* | 3/2005 | Mariani | G06F 11/27 714/13 |
| 2006/0236125 A1* | 10/2006 | Sahita | G06F 12/1458 713/193 |
| 2006/0256107 A1* | 11/2006 | Scarlata | G06F 21/53 345/418 |
| 2007/0294665 A1* | 12/2007 | Papakipos | G06F 8/45 717/119 |
| 2008/0244354 A1 | 10/2008 | Wu et al. | |
| 2013/0243190 A1* | 9/2013 | Yang | H04L 9/0816 380/44 |
| 2016/0119148 A1* | 4/2016 | Ghose | G06F 9/3851 713/176 |

OTHER PUBLICATIONS

Broesch, James D., "Secure Processors for Embedded Applications", Black Hat DC 2007, Feb. 2007, pp. 1-34.

Jeon, et al., "Warped-DMR: Light-weight Error Detection for GPGPU", 2012 IEEE/ACM 45th Annual International Symposium on Microarchitecture, Dec. 2012, pp. 37-47.

Anonymous, et al., "Acceleration Virtualization Method for Hardware Accelerator", IP.com, Prior Art Database Technical Disclosure, IP.com No. IPCOM000209491D, Aug. 2011, 13 pages.

Anonymous, et al., "Method for Handling Page Boundary Crossings Encoundered by a Hardware Accelerator", IP.com Prior Art Database Technical Disclosure, IP.com No. IPCOM000200051D, Sep. 2010, 6 pages.

Lockheed Martin Corporation, "Dynamically Configured Hardware Accelerator Functions", IP.com Prior Art Database Technical Disclosure, IP.com No. IPCOM000171311D, Jun. 2008, 27 pages.

Ray et al., "Dual Use of Superscalar Datapath for Transient-Fault Detection and Recovery", IEEE, Dec. 2001, pp. 214-224.

Shye, et al., "Using Process-Level Redundancy to Exploit Multiple Cores for Transient Fault Tolerance", 37th Annual IEEE/IFIP International Conference on Dependable Systems and Networks (DSN'07), Jul. 2007, 10 pages.

Wang, wt al., "Compiler-Managed Software-based Redundant Multi-Threading for Transient Fault Detection", International Symposium on Code Generation and Optimization (CGO'07), Mar. 2007, 13 pages.

List of IBM Patents or Patent Applications Treated as Related dated Dec. 5, 2017, 2 pages.

* cited by examiner

MAINTAINING SYSTEM RELIABILITY IN A CPU WITH CO-PROCESSORS

STATEMENT REGARDING FEDERALLY SPONSORED RESEARCH OR DEVELOPMENT

This invention was made with Government support under Contract No. HR0011-13-C-0022 awarded by The Defense Advanced Research Projects Agency (DARPA). The Government has certain rights in this invention.

BACKGROUND

Technical Field

The present invention generally relates to computers and, in particular to, maintaining system reliability in a CPU with co-processors.

Description of the Related Art

Currently, many computer systems employ accelerators (e.g., co-processors such as Graphical Processing Units (GPUs)) to enhance the performing of such system, where programs run on both the CPU and the accelerators. In order to improve system-level reliability, conventional approaches focus on improving the reliability in the CPUs. However, among other deficiencies as readily appreciated by one of ordinary skill in the art, such conventional approaches fail to consider the error that can happen in the accelerator and do not consider how to recover from the error. Thus, there is a need for an improved approach for enhancing the system-level reliability of computer systems that use accelerators.

SUMMARY

According to an aspect of the present invention, a computer-implemented method is provided that is performed in a computer having a processor and multiple co-processors. The method includes launching a same set of operations in each of an original co-processor and a redundant co-processor, from among the multiple co-processors, to obtain respective execution signatures from the original co-processor and the redundant co-processor. The method further includes detecting an error in an execution of the set of operations by the original co-processor, by comparing the respective execution signatures. The method also includes designating the execution of the set of operations by the original co-processor as error-free and committing a result of the execution, responsive to identifying a match between the respective execution signatures. The method additionally includes performing an error recovery operation that replays the set of operations by the original co-processor and the redundant co-processor, responsive to identifying a mismatch between the respective execution signatures.

According to another aspect of the present invention, a computer program product is provided for maintaining reliability of a computer having a processor and multiple co-processors. The computer program product comprising a non-transitory computer readable storage medium having program instructions embodied therewith, the program instructions executable by a computer to cause the computer to perform a method. The method includes launching a same set of operations in each of an original co-processor and a redundant co-processor, from among the multiple co-processors, to obtain respective execution signatures from the original co-processor and the redundant co-processor. The method further includes detecting an error in an execution of the set of operations by the original co-processor, by comparing the respective execution signatures. The method also includes designating the execution of the set of operations by the original co-processor as error-free and committing a result of the execution, responsive to identifying a match between the respective execution signatures. The method additionally includes performing an error recovery operation that replays the set of operations by the original co-processor and the redundant co-processor, responsive to identifying a mismatch between the respective execution signatures.

According to yet another aspect of the present invention, a computer processing system is provided. The computer processing system includes a processor. The computer processing system further includes multiple co-processors operably coupled to the processor. The computer processing system also includes a runtime system, configured to launch a same set of operations in each of an original co-processor and a redundant co-processor, from among the multiple co-processors, to obtain respective execution signatures from the original co-processor and the redundant co-processor. The runtime system is further configured to detect an error in an execution of the set of operations by the original co-processor, by comparing the respective execution signatures. The runtime system is also configured to designate the execution of the set of operations by the original co-processor as error-free and committing a result of the execution, responsive to identifying a match between the respective execution signatures. The runtime system is additionally configured to perform an error recovery operation that replays the set of operations by the original co-processor and the redundant co-processor, responsive to identifying a mismatch between the respective execution signatures.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to maintaining system reliability in a Central Processing Unit (CPU) with co-processors. It is to be appreciated that the terms "co-processor" and "accelerator" are used interchangeably herein.

The present invention can be applied to maintain the reliability of a computing system with attached accelerators including, but not limited to, Graphics Processing Units (GPUs) and so forth.

In an embodiment, the present invention uses an accelerator to perform a redundant computation (with respect to another accelerator) in order to detect errors on the CPU. In an embodiment, the present invention provides an approach to recover from such errors.

The present invention (i) targets overall computing system reliability, (ii) leverages the redundant accelerator, and (iii) includes a novel error recovery mechanism.

The use of accelerators allows a computing system that includes such accelerators to achieve enhanced performance and/or enhanced energy efficiency over a computing system that lacks such accelerators. However, as readily appreciated by one of ordinary skill in the art, such a computing system still may not meet a reliability requirement because the accelerators emphasize performance and energy efficiency optimization but not reliability optimization. In an embodiment directed to addressing the problem of guaranteeing system-level reliability in a computing system having multiple accelerators, the present invention provides an approach that involves error checking as well as error recovery. To detect the occurrence of errors in the execution of one or more operations by an accelerator, the present invention uses another (i.e., a redundant) accelerator to perform the same computation. The present invention detects the occurrence of an error in the execution by comparing respective signatures of the respective outputs from the original execution and the redundant execution. A mismatch there between represents the occurrence of an error, while a match represents an absence of an error in the execution.

In an embodiment, the present invention provides a novel approach that launches the redundant execution by replaying a set of operations, which potentially modify the state of the original co-processor to that of the redundant co-processor. Upon detecting the error, the present invention recovers from the error by replaying the set of operations to the co-processors.

In an embodiment, the present invention essentially provides a Dual-Launch Redundancy (DLR) scheme that is orchestrated by the host processor, wherein the host processor uses a redundant co-processor to check the execution of a set of operations by another (i.e., original) co-processor in an initial DLR run, and which is responsible for re-initiating the DLR run upon the detection of an error in the initial DLR run.

Figure 1:
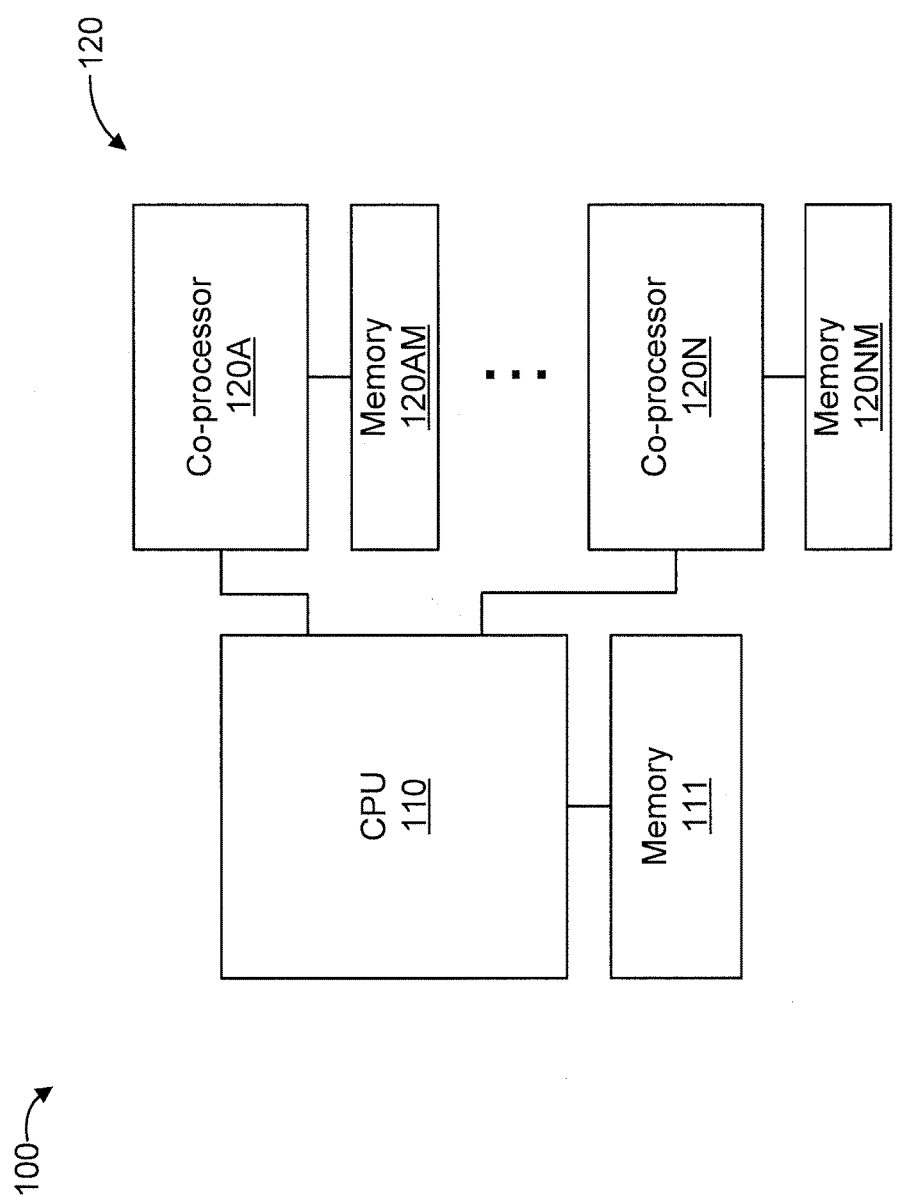
FIG. 1 shows an exemplary computer processing system to which the invention principles can be applied, in accordance with an embodiment of the present invention.

FIG. 1 shows an exemplary computer processing system 100 to which the invention principles can be applied, in accordance with an embodiment of the present invention.

The computer processing system 100 includes a CPU (Central Processing Unit) 110. The computer processing system 100 further includes multiple co-processors 120. The multiple co-processors 120 include co-processors 120A-120N. The multiple co-processors can be, for example, but are not limited to, GPUs (Graphics Processing Unit) and/or other types of co-processors/accelerators.

The CPU 110 has its own dedicated physical memory 111. Each of the multiple co-processors 120A-120N has its own dedicated physical memory 120AM-120NM, respectively.

The CPU 110 is responsible for managing the multiple co-processors 120. Accordingly, the CPU 110 is interchangeably referred to herein as the "host", and the co-processors 120 are interchangeably referred to herein as "devices" or the "device" in short.

Of course, the computer processing system 100 can also include other elements (not shown), as readily contemplated by one of skill in the art, as well as omit certain elements. For example, various input devices and/or output devices can be included in computer processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer processing system 100 are readily contemplated by one of ordinary skill in the art given the teachings of the present invention provided herein.

Figure 5:
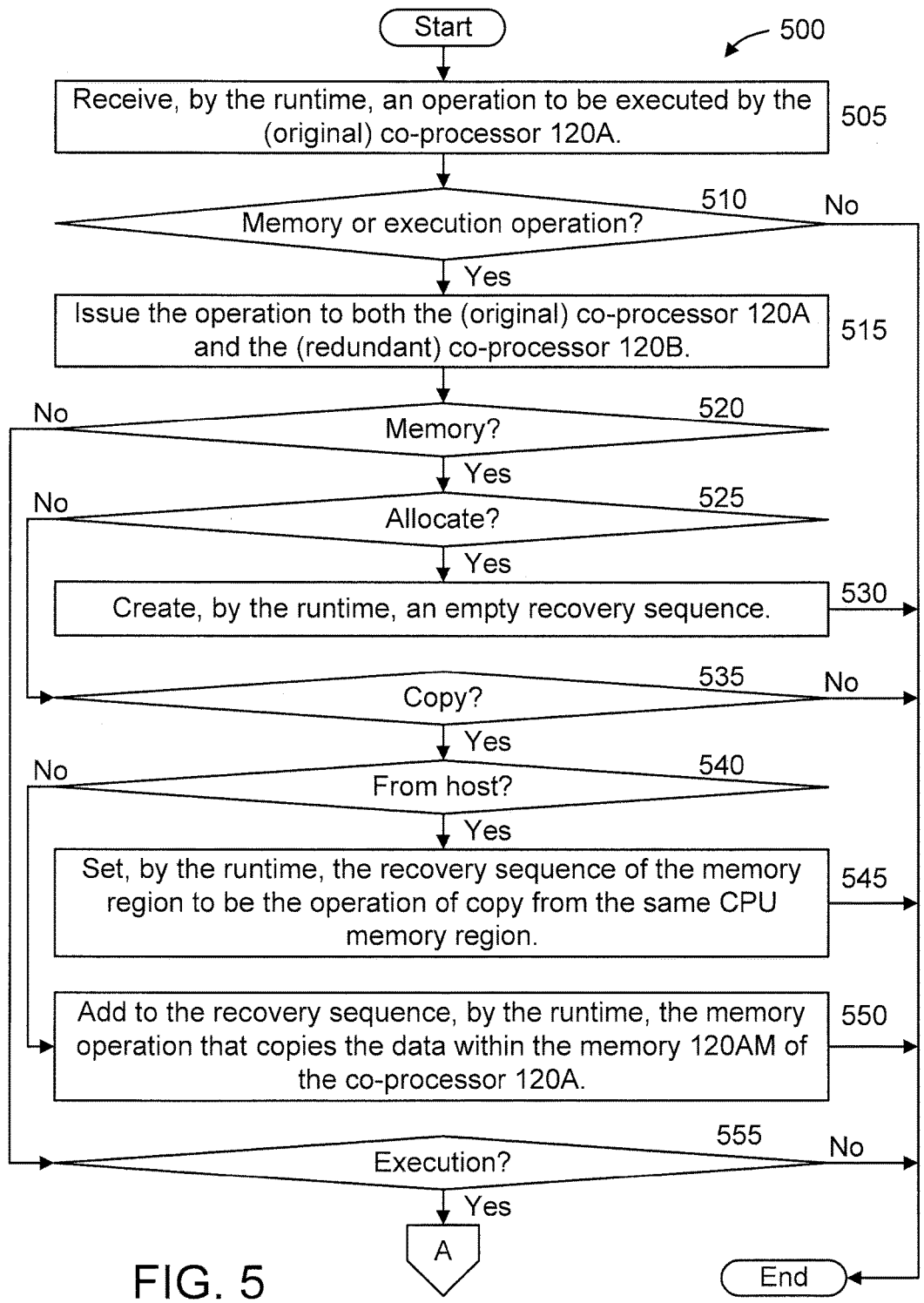
FIGS. 5-6 show an exemplary method for maintaining system reliability in a CPU with co-processors, in accordance with an embodiment of the present invention.

It is to be appreciated that processing system 100 may perform at least part of the method described herein including, for example, at least part of method 500 of FIG. 5.

Figure 2:
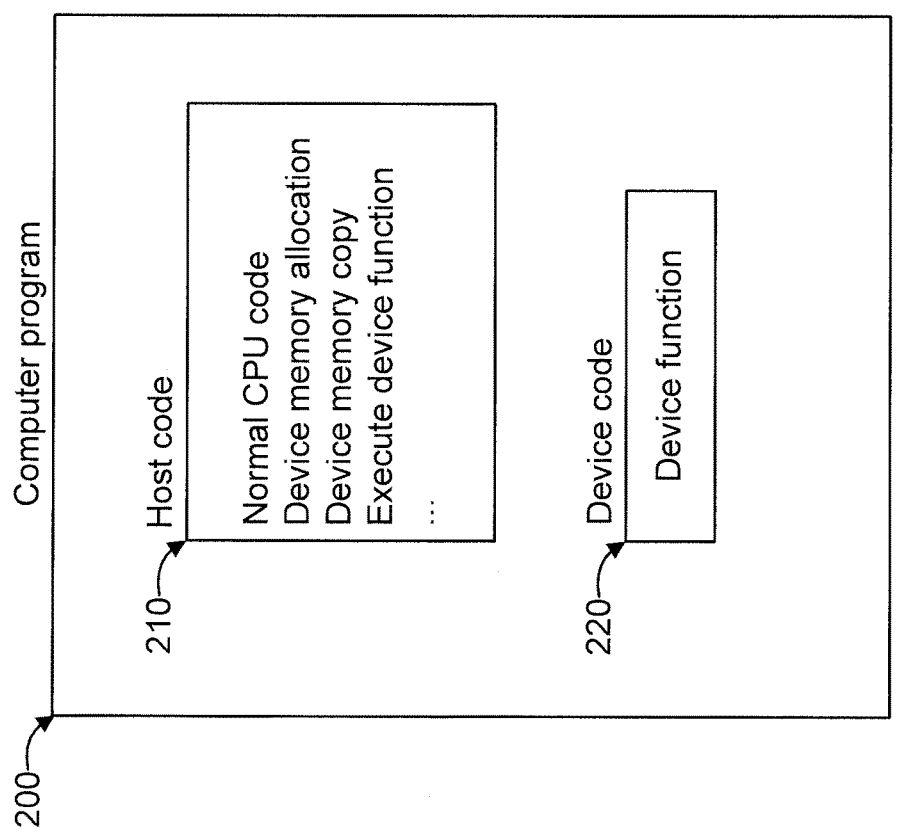
FIG. 2 shows an exemplary computer program that uses the co-processors of FIG. 1 for acceleration, in accordance with an embodiment of the present invention.

FIG. 2 shows an exemplary computer program 200 that uses the co-processors 120 of FIG. 1 for acceleration, in accordance with an embodiment of the present invention.

The computer program 200 includes two parts of codes, namely the host code 210 and the device code 220. The host code 210 runs on the CPU 110, and the device code 220 runs on one or more of the co-processors 120.

The device code 220 performs the computation that is accelerated by one or more of the co-processors 120.

The host code has two categories. The first category is the same as the code that runs only on the CPU 110, while the second category manages the co-processors 120.

The second category for managing the co-processors 120 can be further divided into two sub-categories. The first sub-category manages the memories in the co-processors, which typically includes the operations of device memory allocation, memory copy between the host and the device, memory copy within the device, and binding the memory to the special cache in the device. The second sub-category manages the execution of device code 220 such as pushing the argument to the stack and initiating the execution of a function in the device code 220.

In an embodiment, the present invention is configured to operate for a host-device system that does not have coherent memory during device execution, which means the device code cannot directly access or modify the CPU's memory 111.

In another embodiment, directed to the present invention being configured to operate for a host-device system that has coherent memory, the present invention has the host (CPU) 110 checkpoint the memory region (in the CPU's memory 111) that the device 120 might access.

Figure 3:
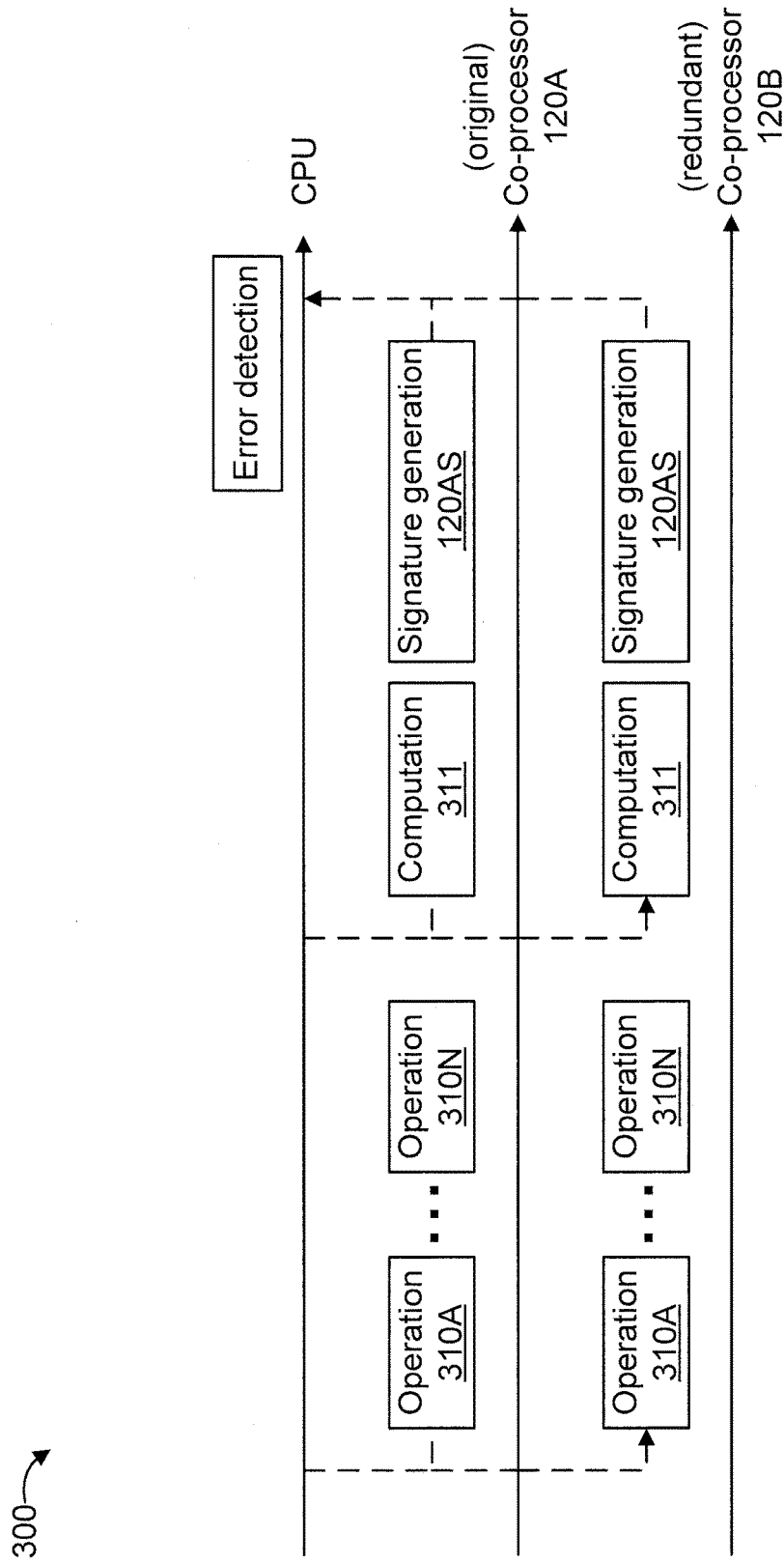
FIG. 3 shows an exemplary timeline for detecting an error in a device computation, in accordance with an embodiment of the present invention.

FIG. 3 shows an exemplary timeline 300 for detecting an error in a device computation, in accordance with an embodiment of the present invention. The device computation can be, for example, execution of a function in the device code. For the sake of illustration, timeline 300 is described with respect to use of the CPU 110 and co-processors 120A and 120B, with co-processor 120A interchangeably referred to as the "original processor" and with co-processor 120B interchangeably referred to as the "redundant co-processor".

The host code part of the program running on the CPU 110 launches several operations (operations 310A through 310N) to allocate and set up the memory in the co-processor 120A, and then launches the computation operation (computation 311) in the co-processor 120A, during which an error might occur. In an embodiment, the operations 310A-310N can correspond to a compute kernel or a portion of the compute kernel. In an embodiment, the operations 310A-310N performed by co-processor 120B can be a shadow copy of kernel code or a portion thereof.

The present invention uses a separate redundant co-processor 120B to detect the error. The redundant co-processor 120B performs the same computation as in the original co-processor 120A. That is, the host code part of the program running on the CPU 110 launches the same several operations (operations 310A through 310N) to allocate and set up the memory in the co-processor 120B, and then launches the same computation operation (computation 311) in the co-processor 120B. The redundant computation (computation 311 by co-processor 120B) requires a replica of the input (to the computation 311 by co-processor 120A).

The naive approach for replicating the input is to copy the input from the original co-processor 120A. However, this can result in significant performance degradation because the memory copy from the original co-processor 120A to the redundant co-processor 120B becomes the critical path of the program execution. Moreover, the memory copy overhead repeats for every single computation operation.

In contrast to the aforementioned naive approach, the present invention proactively launches the redundant memory copy immediately following the original memory operation. This proactive approach avoids the drawbacks mentioned above regarding the naive approach for replicating the input.

Still referring to FIG. 3, each of the co-processors 120A and 120B generate a respective signature 120AS and 120BS, based on their respective executions of the operations (operations 310A through 310N). These signatures 120AS and 120BS are compared to each other. If the signatures 120AS and 120BS are different, then an error is detected. Otherwise, if the signatures 120AS and 120BS are the same, then the execution by the co-processor 120A is considered to be error-free and the results of the execution (e.g., computation) are committed. Hence, error detection is based on the execution state of the co-processors (in this example, co-processors 120A and 120B) and not output comparisons. In an embodiment, the respective execution signatures are directed to a specific execution state within a launched kernel.

Figure 4:
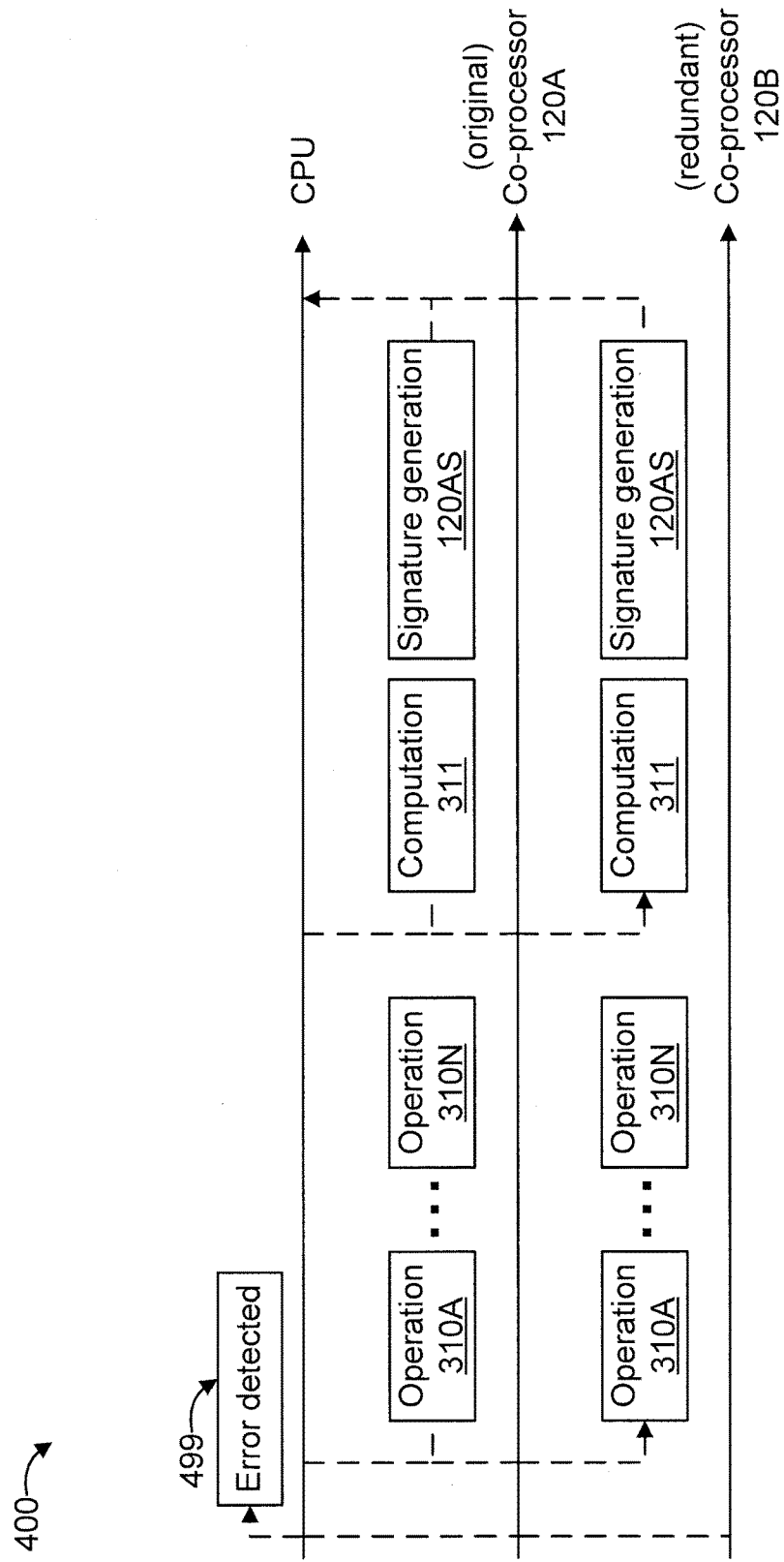
FIG. 4 shows an exemplary timeline for recovering from a detected error in a device computation, in accordance with an embodiment of the present invention.

FIG. 4 shows an exemplary timeline 400 for recovering from a detected error in a device computation, in accordance with an embodiment of the present invention.

A fundamental observation exploited by the present invention is that the host processor CPU 110 always has the correct memory state, that is, before the erroneous device state. This observation simplifies the error recovery so that the CPU 110 can relaunch a certain set of operations, which follow a certain relaunch sequence, for executing the function in the device code. As an example, FIG. 4 show the simplest case, noting that the present invention can be readily applied to other cases, given the teachings of the present invention provided herein, while maintaining the spirit of the present invention. Once the error is detected 499, the CPU 110 relaunches the same operations (operations 310A through 310N) between the last correct device function execution and this erroneous device function execution. The relaunch happens in both the original co-processor 120A and the redundant co-processor 120B so error-free execution can be guaranteed.

Figure 6:
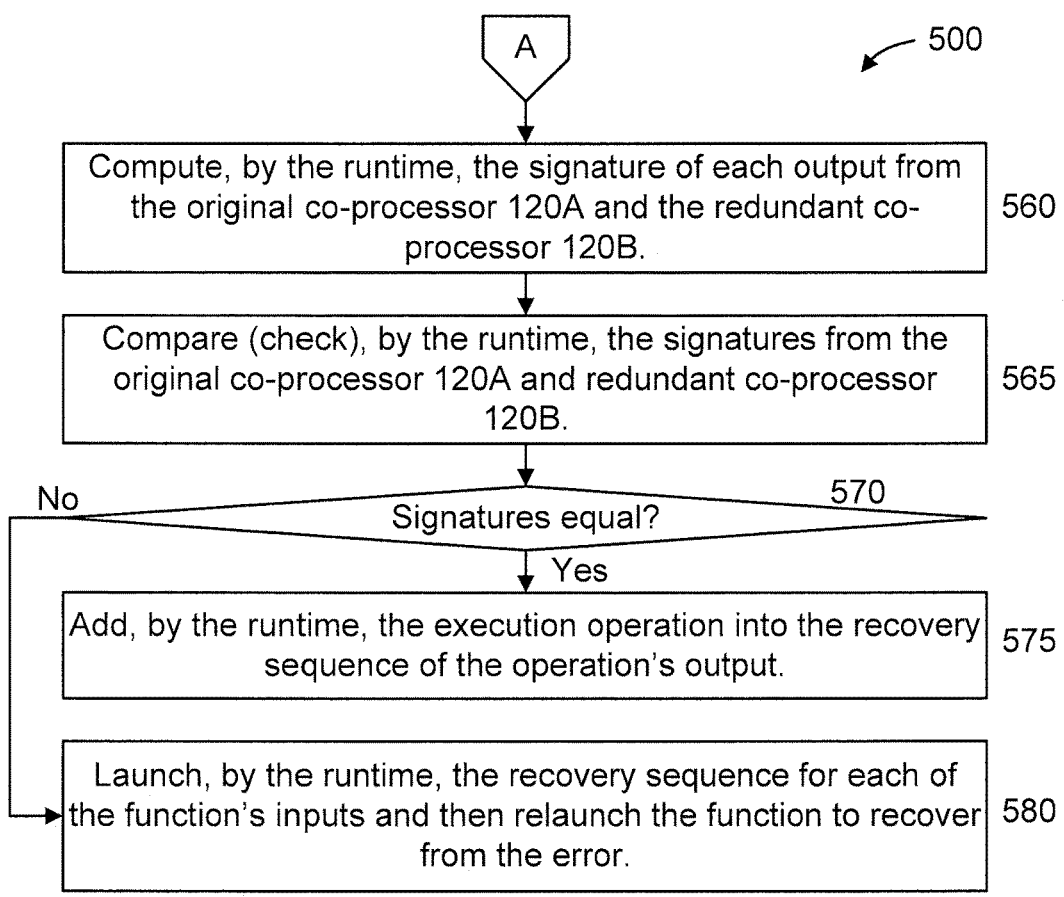

FIGS. 5-6 show an exemplary method 500 for maintaining system reliability in a CPU with co-processors, in accordance with an embodiment of the present invention.

In an embodiment, method 500 can be fitted in the runtime software that manages co-processors. The runtime software and corresponding supporting hardware are interchangeably referred to herein as the "runtime system". The program (e.g., program 200 of FIG. 2) uses the operation Application Programming Interface (API) in the runtime to manage the memory and execution of the co-processors.

For the sake of illustration, method 500 is described with respect to CPU 110 and co-processors 120A and 120B, with co-processor 120A acting as the "original co-processor" and with co-processor 120B acting as the "redundant co-processor" for the purposes of the present invention.

At step 505, receive, by the runtime, an operation to be executed by the (original) co-processor 120A.

At step 510, determine, by the runtime, whether the operation is a memory operation or an execution operation. If so, then proceed to step 515. Otherwise, the method is terminated.

At step 515, issue the operation to both the (original) co-processor 120A and the (redundant) co-processor 120B.

At step 520, determine, by the runtime, whether the operation is a memory operation. If the operation is a memory operation, then proceed to step 525. Otherwise, proceed to step 555.

At step 525, determine, by the runtime, whether the memory operation allocates memory in the co-processor 210A. If so, then proceed to step 530. Otherwise, proceed to step 535.

At step 530, create, by the runtime, an empty recovery sequence. That is, create a data structure, referred to herein as the "recovery sequence", for the allocated memory region in the co-processor 210A.

At step 535, determine, by the runtime, whether the memory operation is a memory copy operation. If so, then proceed to step 540. Otherwise, the method is terminated.

At step 540, determine, by the runtime, whether the memory operation copies the data from the CPU 110 (i.e., the host) to the memory 120AM of the co-processor 120A. If so (i.e., the memory operation copies the data from the CPU 110 to the memory 120AM of the co-processor 120A), then proceed to step 545. Otherwise (i.e., the memory operation copies the data within the memory 120AM of the co-processor 120A), then proceed to 550.

At step 545, set, by the runtime, the recovery sequence of the memory region to be the operation of copy from the same CPU memory region.

At step 550, add to the recovery sequence, by the runtime, the memory operation that copies the data within the memory 120AM of the co-processor 120A.

At step 555, determine whether the operation has executed in the co-processors 120A and 120B. If so, then proceed to step 560. Otherwise, the method is terminated.

At step 560, compute, by the runtime, the signature of each output from the original co-processor 120A and the redundant co-processor 120B.

At step 565, compare (check), by the runtime, the signatures from the original co-processor 120A and redundant co-processor 120B.

At step 570, determine, by the runtime, whether the signatures match (are equal). If so, then proceed to step 575. Otherwise, proceed to step 580. It is to be appreciated that a determination that the signatures match represents an error-free execution, while a determination that the signatures do not match represents the detection of an error in the execution.

At step 575 (corresponding to an error-free execution), add, by the runtime, the execution operation into the recovery sequence of the operation's output.

At step 580 (corresponding to the detection of an error during the execution), launch, by the runtime, the recovery sequence for each of the function's inputs and then relaunch the function to recover from the error.

It is to be appreciated that the recovery sequence for an input memory can have one or multiple operations. In the simplest case, the recovery sequence is only one single memory copy operation from the CPU memory. In a more complicated case, the input is the output from another function. The recovery sequence for the input is the execution operation of the other function, which can trigger the recovery sequence of the function's input. The runtime function repeats these steps until no error is detected.

Thus, the present invention detect errors in an execution by a co-processor by generating independent signatures based on executing a set of operations, e.g., one signature in each co-processor (that is, the co-processor originally intended to execute the set of operations and a redundant accelerator), where the signatures from the two co-processors are compared such that:

(1) if different, an error is detected; and
(2) if the same, the set operations are deemed error-free and are thus committed.

Hence, error detection is based on the execution state of the co-processors (the original co-processor and the redundant co-processor) and not output comparisons Upon detecting an error, error recovery is initiated, which involves "replaying" the same set of operations by both co-processors. That is, the CPU relaunches the same set of operations between the last correct device function execution and the erroneous execution. In this way, error recovery is achieved.

Figure 7:
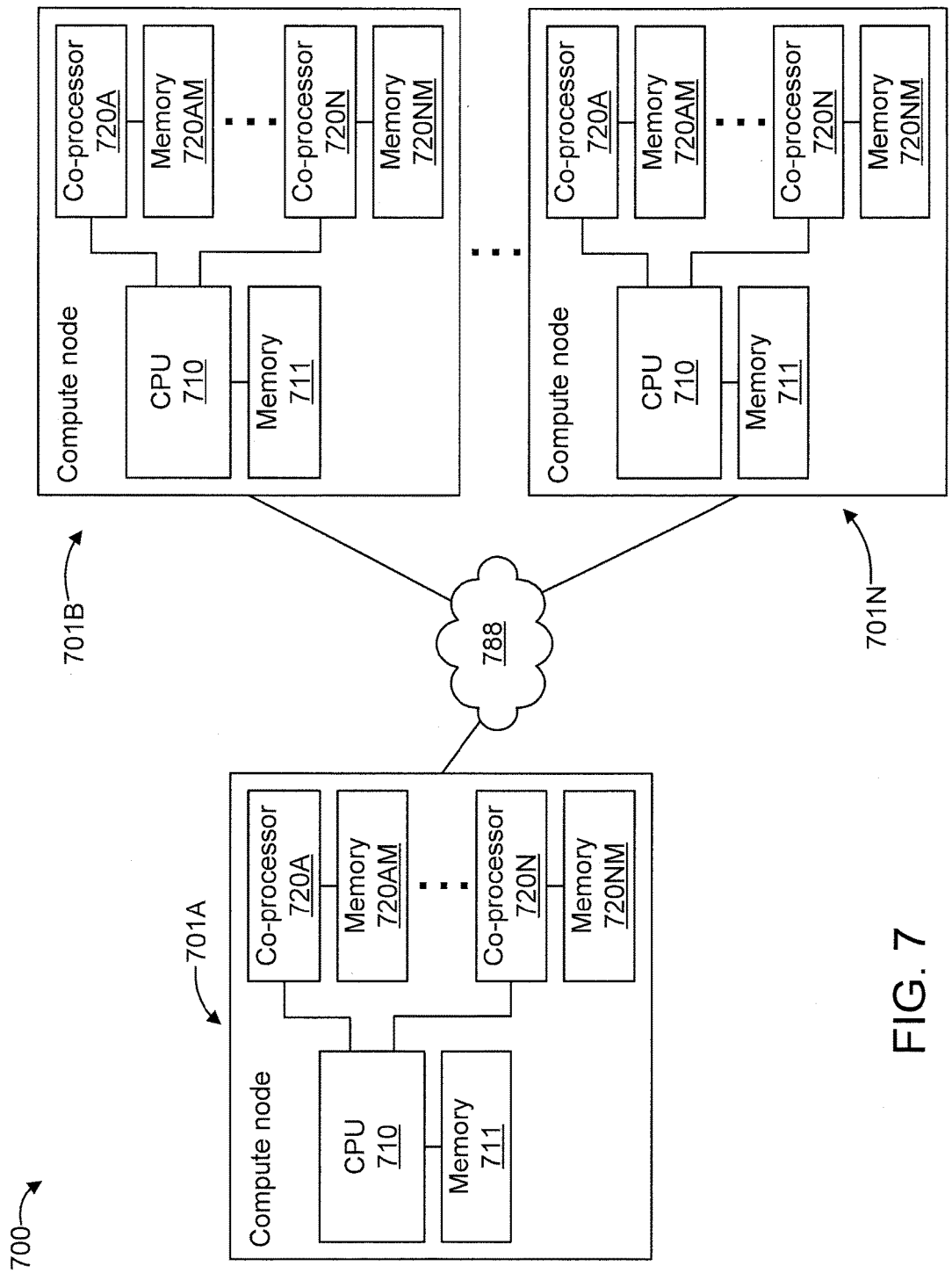
FIG. 7 shows another exemplary computer processing system to which the present invention can be applied, in accordance with an embodiment of the present invention.

FIG. 7 shows another exemplary computer processing system 700 to which the present invention can be applied, in accordance with an embodiment of the present invention. In an embodiment, computer processing system 700 can be considered to implement a super computer having multiple nodes connected by a network.

The present invention handles any detected errors in the accelerators locally. When the local compute node detects the computation error from the device, the CPU in the local compute node launches the recovery sequence to recover from the error. This prevents the error from propagating to the rest of the compute nodes.

The computer processing system 700 includes multiple compute nodes 701A-701N.

Each of the compute nodes 701A-601N includes a CPU 710 and multiple co-processors 720. The multiple co-processors 720 include co-processors 720A-720N. The multiple co-processors can be, for example, but are not limited to, GPUs (Graphics Processing Unit) and/or other types of co-processors/accelerators.

The CPU 710 has its own dedicated physical memory 711. Each of the multiple co-processors 720A-720N has its own dedicated physical memory 720AM-720NM, respectively.

The compute nodes 701A-701N are connected by a network 788.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for maintaining reliability of a computer having a Central Processing Unit (CPU) and multiple co-processors, the computer program product comprising a non-transitory computer readable storage medium having program instructions embodied therewith, the program instructions executable by a computer to cause the computer to perform a method comprising:

launching a same set of operations in each of an original co-processor and a redundant co-processor, from among the multiple co-processors, to obtain respective execution signatures from the original co-processor and the redundant co-processor;

detecting an error in an execution of the set of operations by the original co-processor, by comparing the respective execution signatures;

designating the execution of the set of operations by the original co-processor as error-free and committing a result of the execution, responsive to identifying a match between the respective execution signatures; and performing an error recovery operation that replays the set of operations by the original co-processor and the redundant co-processor, responsive to identifying a mismatch between the respective execution signatures.

2. The computer program product of claim 1, wherein a unit of targeted acceleration is at a kernel-level granularity with respect to a complete application.

3. The computer program product of claim 1, wherein the set of operations executed by the redundant co-processor is a shadow copy of kernel code executed by the original co-processor.

4. The computer program product of claim 3, wherein the shadow copy executed by the redundant co-processor uses a same complete set of input data as the kernel code executed by the original co-processor.

5. The computer program product of claim 1, wherein the respective execution signatures are directed to a specific execution state within a launched kernel.

6. A computer processing system, comprising:
a Central Processing Unit (CPU);
multiple co-processors operably coupled to the CPU; and
a runtime system, configured to:
launch a same set of operations in each of an original co-processor and a redundant co-processor, from among the multiple co-processors, to obtain respective execution signatures from the original co-processor and the redundant co-processor;

detect an error in an execution of the set of operations by the original co-processor, by comparing the respective execution signatures;

designate the execution of the set of operations by the original co-processor as error-free and committing a result of the execution, responsive to identifying a match between the respective execution signatures; and perform an error recovery operation that replays the set of operations by the original co-processor and the redundant co-processor, responsive to identifying a mismatch between the respective execution signatures.

7. The computer processing system of claim 6, wherein the computer processing system is comprised in a single node of a multi-computer processing system, and wherein the runtime system is further configured to prevent the error from propagating to other nodes in the multi-node computing system.

\* \* \* \* \*